United States Patent
Bayley et al.

(10) Patent No.: US 6,717,507 B1
(45) Date of Patent: Apr. 6, 2004

(54) RADIO FREQUENCY TAGS FOR MEDIA ACCESS AND CONTROL

(75) Inventors: Oliver T. Bayley, Pacifica, CA (US); Bernard J. Kerr, Wellington (NZ); Geoffrey M. Smith, Palo Alto, CA (US); James E. Dishman, Portland, OR (US); Mark A. McCabe, San Mateo, CA (US)

(73) Assignee: Interval Research Corporation ( * ) Notice: Subject to any disclaimer, the term of this patent is extended or adjusted under 35 U.S.C. 154(b) by 0 days.

(21) Appl. No.: 09/351,262

(22) Filed: Jul. 12, 1999

(51) Int. Cl.[7] .............................................. G05B 23/02
(52) U.S. Cl. .................................... 340/5.1; 340/572.1
(58) Field of Search ...................... 340/5.1, 5.5, 5.61, 340/5.74, 5.86, 10.1, 10.5, 10.42, 568.1, 568.8, 572.1, 572.3, 572.4; 345/721, 739; 725/133, 141

(56) References Cited

U.S. PATENT DOCUMENTS

| | | |
|---|---|---|
| 5,434,572 A | 7/1995 | Smith |
| 5,461,385 A | 10/1995 | Armstrong .................. 342/42 |
| 5,550,547 A | 8/1996 | Chan et al. .................. 342/42 |
| 5,729,697 A | 3/1998 | Schkolnick et al. ........ 395/223 |
| 5,764,138 A | 6/1998 | Lowe .......................... 340/447 |
| 5,798,693 A | 8/1998 | Engellenner |
| 5,982,363 A | * 11/1999 | Naiff .......................... 345/721 |
| 6,008,727 A | 12/1999 | Want et al. ............... 340/572.1 |
| 6,036,086 A | 3/2000 | Sizer, II et al. |

* cited by examiner

*Primary Examiner*—Michael Horabik
*Assistant Examiner*—William Bangachon
(74) *Attorney, Agent, or Firm*—Van Pelt & Yi LLP

(57) ABSTRACT

Provided are RF tags configured to access and/or control electronic media. These tags have a memory programmed to access a particular media source when polled by a RF transceiver connected with (preferably integrated with) a media player. The memory of tags may also be programmed with control parameters relating to the accessed piece of electronic media content. That is, the tags' memories may be written to with information relating to the tag user's preferences with respect to the piece of media, for example parameters such as volume or language for an audiovisual piece of media. Such preferences may be determined, for example, based on previous uses of the media. Or, the memory may register the place in the playback of the media when the tag is removed from the RF field of the RF transceiver so that playback may be resumed from that place when the tag again enters the field and is polled by the transceiver. RF media access and control systems incorporating such tags, and methods of using them are also provided.

28 Claims, 5 Drawing Sheets

US 6,717,507 B1

RADIO FREQUENCY TAGS FOR MEDIA ACCESS AND CONTROL

CROSS-REFERENCE TAGS FOR ACCESS AND CONTROL

This application is related to application Ser. No. 09/306,688, filed May 6, 1999, entitled INTERACTIVE RADIO FREQUENCY TAGS, the disclosure of which is incorporated by reference herein for all purposes.

BACKGROUND OF THE INVENTION

The present invention relates generally to the field of radio frequency tag technology. More specifically, the present invention relates to passive radio frequency tags which are capable of accessing and controlling various forms of electronic media.

Radio frequency (RF) tag technology has conventionally been used for identifying objects in radio frequency identification (RF ID) systems. In an RF ID system, information is carried on a tag (transponder) which is typically attached to an object of interest. When the tag comes within a RF signal field generated by a reader (transceiver) the tag responds to the incident RI signal. Typically, the tag reflects the incident RF carrier back to the reader in a form modulated by the tag according to the information with which the tag has been previously programmed.

RF tags may be passive or active. Active tags are powered by a battery which is incorporated into the tag. Passive tags do not have batteries. They derive their power inductively from the RF signal transmitted by the reader to interrogate the tag.

FIG. 1 illustrates a conventional passive RF tag. The tag 100 has two main components: a semiconductor chip (integrated circuit (IC)) 102 having RF circuits, logic and memory (not shown); and an antenna 104. The RF circuits of the IC 102 portion of a passive RF tag typically include an analog and a digital circuit. The analog circuit detects and decodes the RF signal and provides power to the digital circuit using the RF field strength of the reader. The digital circuit implements an information protocol which has been previously programmed into the tag. RF tags generally also include a variety of other discrete components, such as capacitors, clocks, and interconnections between components, a substrate for mounting components, and an enclosure.

As noted above, radio frequency (RF) tag technology, particularly passive RF tag technology, has conventionally been used for identifying objects in radio frequency identification (RF ID) systems. Thus the conventional application of RF tags has been in tracking objects of interest. When the tag comes within a RF signal field generated by a reader (transceiver) the tag responds to the station's incident RF signal alerting the station of its presence. A typical reader includes a computer processor which issues commands to a RF transmitter and receives commands from an RF receiver. The processor may also perform one or more functions based on the tag's presence in its RF field.

For example, RF tags are used by airlines to track passenger luggage. When a passenger checks a piece of luggage it is tagged with an RF ID tag programmed with an identifier for that piece of luggage. When the luggage tag comes within the RF signal field of one of many RF ID readers located throughout the luggage system, the tag may be interrogated by the reader and the location of the luggage may be reported to a central tracking system by the reader's processor. Similarly, RF tag technology is used in "card key" systems. A card key contains a RF ID tag identifying the holder as a person authorized to pass through a door or gate. When the card comes within the RF signal field of an RF ID reader located at a door or gate, the tag may be interrogated by the reader and the authorization of the cardholder to pass may be confirmed, the door or gate my be opened, and the cardholder's passage recorded by the reader's processor.

While conventional implementations of RF tag technology have been useful in such tracking applications, the role of RF tags in these applications is static. That is, once a passive IF tag is programmed with information, it is simply polled by a reader and responds with the programmed information. The present inventors believe that RF tag technology offers the potential for a whole array of unexplored applications based on RF tags with increased functionality. Accordingly, the development and application of such RF tags with increased functionality is desired.

SUMMARY OF THE INVENTION

The present invention meets this desire by providing RF tags which are capable of accessing and/or controlling electronic media. These tags have a memory programmed to access a particular media source when polled by a RF transceiver associated with (preferably integrated with) a media player. The memory of tags in accordance with the present invention may also be programmed with control parameters relating to the accessed piece of electronic media content. That is, the tags' memories may be written to with information relating to the tag user's preferences with respect to the piece of media, for example parameters such as volume or language for an audiovisual piece of media. Such preferences may be determined, for example, based on previous uses of the media. Or, the memory may register the place in the playback of the media when the tag is removed from the RF field of the RF transceiver so that playback may be resumed from that place when the tag again enters the field and is polled by the transceiver. RF media access and control systems incorporating such tags, and methods of using them are also provided.

This media access/control functionality may be combined with an interactive functionality, such as described in co-pending application Ser. No. 09/306,688, previously incorporated by reference, to provide additional levels of control of the media player.

In one aspect, the present invention provides a media access and control radio frequency tag apparatus. The apparatus includes a passive radio frequency transponder having an antenna, an integrated circuit responsive to a signal received from a radio frequency transceiver to return to the transceiver a signal having at least one of access and control parameters relating to a piece of electronic media content, and a memory operative to provide storage and retrieval of data relating to the parameters. The apparatus may also include an interface for receiving an external stimulus, and one or more integrated circuit components responsive to an external stimulus received at the interface to change the state of the transponder.

In another aspect, the invention provides a radio frequency tag having a memory in which a universal resource locator (URL) is stored.

Another aspect of the invention provides a radio frequency media access and control system. The system includes a radio frequency transceiver having an antenna, a radio frequency field generator, and a processor capable of controlling said radio frequency generator to produce a signal, and responsive to a signal returned by a radio frequency transceiver to conduct at least one of access and control functions for a piece of electronic media content. The system also includes a passive radio frequency transponder having an antenna, an integrated circuit responsive to a signal received from a radio frequency transceiver to return to the transceiver a signal comprising at least one of access and control parameters relating to a piece of electronic media content, and a memory operative to provide storage and retrieval of data relating to the parameters.

In yet another aspect, the invention provides a method of accessing and controlling electronic media. The method involves providing a passive radio frequency transponder having a memory, providing a media player having a radio frequency transceiver which generates a radio frequency field having one or more radio frequency signals that are capable of conducting at least one of reading to and writing from functions for the memory of said transponder, and conducting at least one of reading to and writing from the memory of the transponder, electronic media access and control parameters.

In an additional aspect, the invention provides a method of providing subscriber-specific electronic media access and control. The method involves providing a subscriber with a passive radio frequency transponder having a memory programmed with electronic media access and/or control parameters. The access and/or control parameters allow the subscriber to access and/or control particular electronic media defined by the parameters when said transponder is read by a radio frequency transceiver connected with a player for the electronic media.

Further, the invention provides a method of cross-promoting a consumer product and electronic media. The method involves incorporating with a consumer product a passive radio frequency transponder having a memory programmed with electronic media access parameters, and providing access to electronic media defined by the parameters when the transponder is read by a radio frequency transceiver connected with a player for said electronic media.

These and other features and advantages of the present invention will be presented in more detail in the following specification of the invention and the accompanying figures which illustrate by way of example the principles of the invention.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to one or more preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention meets this desire by providing RF tags which are capable of accessing and/or controlling electronic media. These tags have a memory programmed to access a particular media source when polled by a RF transceiver associated with (preferably integrated with) a media player. The memory of tags in accordance with the present invention may also be programmed with control parameters relating to the accessed piece of electronic media content. That is, the tags' memories may be written to with information relating to the tag user's preferences with respect to the piece of media, or the memory may register the place in the playback of the media when the tag is removed from the RF field.

RF tag structures and configurations are well known to those of skill in the art, and implementation details of RF tags, beyond the functional elements described herein, are not a focus of the present invention. That is, one of ordinary skill in the RF tag technology art would be able to make and implement tags in accordance with the present invention without specific guidance with regard to the combination and configuration of all tag elements, and the present invention is not limited by any particular implementation.

Figure 1:
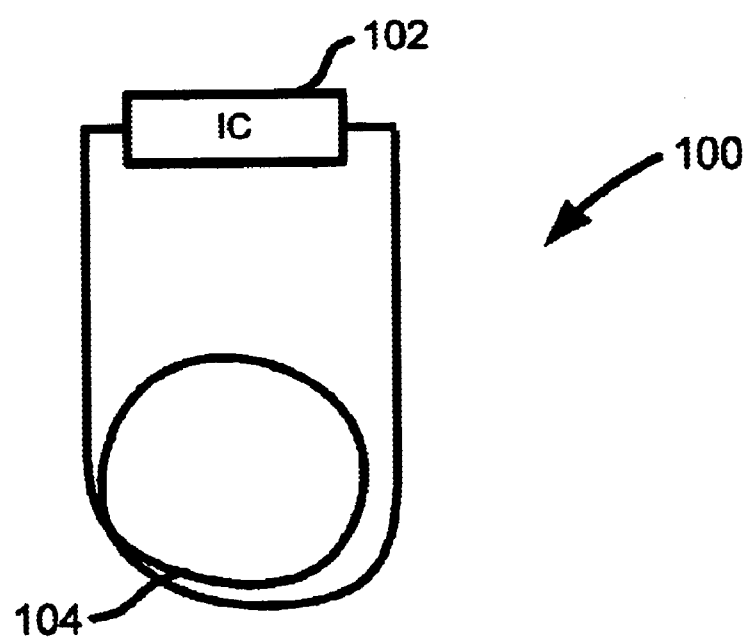
FIG. 1 depicts a block diagram illustrating features of a conventional passive RF tag.
Figure 2A:
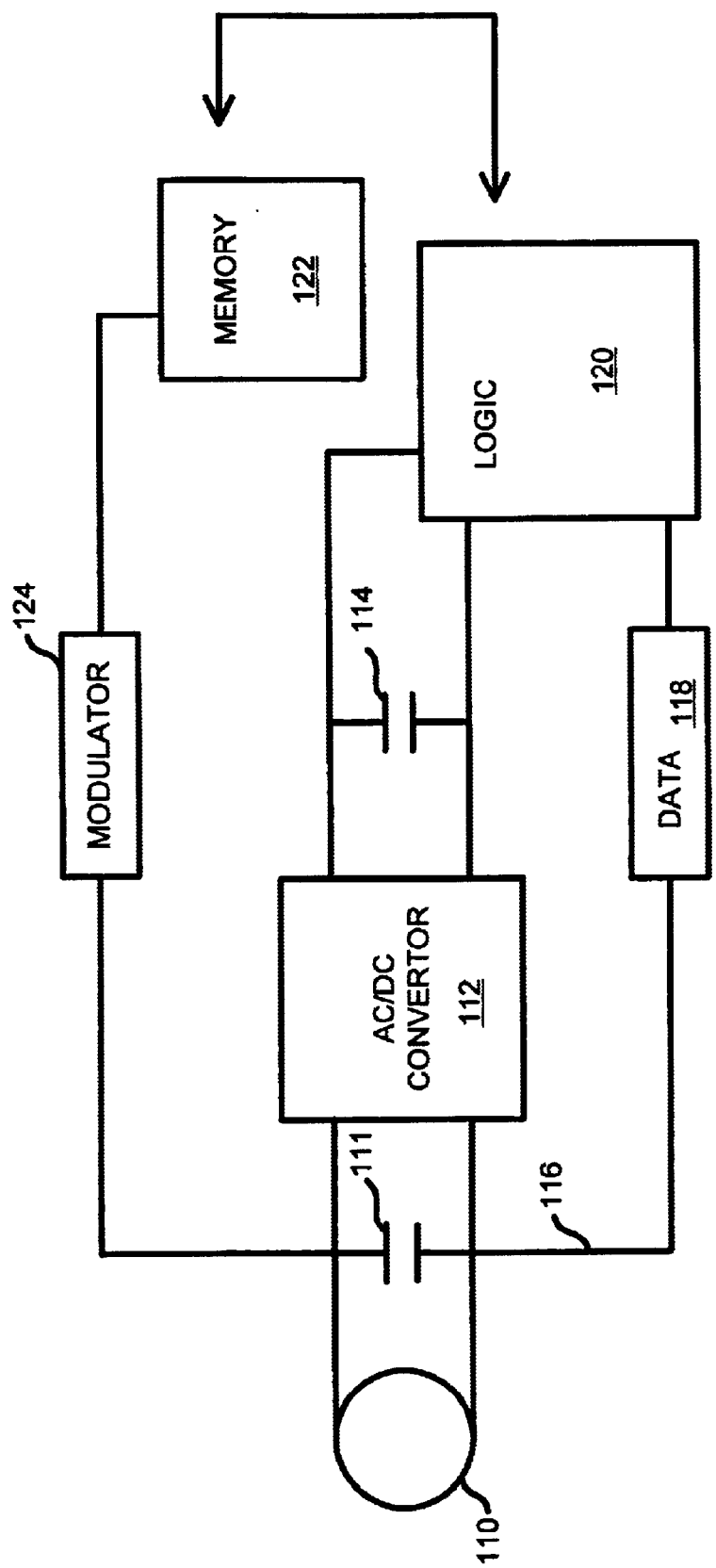
FIG. 2A depicts a block diagram illustrating features of a media access and control RF tag in accordance with a preferred embodiment of the present invention.

FIG. 2A depicts a block diagram providing structural information for a typical passive RF tag in accordance with a preferred embodiment of the present invention. The figure is not a schematic depiction of an RF tag, but is intended as an illustration of the main function elements of a typical tag and their interconnections to provide a basis for describing the actions that take place when a tag enters the RF field of a reader, in order to assist in the understanding of the operation of RF tags in accordance with the present invention.

An RF signal from a transceiver is received by the tag's antenna 110 when the tag enters the reader's RF field. From the antenna 110, the signal is typically split into a portion that provides the power for the tag which is smoothed by a capacitor 111, and a portion that provides the data to be read by and responded to by the tag's programmed logic. The power portion of the signal goes into a rectifier 112 (AC to DC converter) and the emerging DC signal is smoothed by a capacitor 114. The data portion of the split signal is conveyed along a conductive line 116 to a data extractor 118 which demodulates the signal and extracts the digital binary command data for the logic processor 120.

The logic processor 120 receives the command and carries out the command instructions, which typically involves reading data from the tag's memory 122. A RF tag is in accordance with the present invention has electronic media access and/or control data stored in its memory. For example, the RF tag may be programmed to provide access to the user based on the user's subscription agreement with the cable provider, or the tag may be programmed with a URL to provide access to a particular Internet or World Wide Web site.

The data read from the memory 124 is then output to a modulator 124 which modulates the digital data into an analog signal. The signal is then conveyed to the antenna 110 and transmitted back to the transceiver. RF tags in accordance with the present invention may also include additional elements well known to those of skill in the art not illustrated in FIG. 2A or discussed herein, such as encoders/decoders and clock extractors.

In addition to reading from the memory 122, the logic processor 120 may also write to the memory 122 with information relating to the tag user's preferences with respect to the piece of media. For example, the memory may be written to with control parameters such as volume or brightness levels for an audiovisual piece of media. Such preferences may be determined, for example, based on previous uses of the media. Or, the memory may register the place in the playback of the media when the tag is removed from the RF field of the RF transceiver so that playback may be resumed from that place when the tag again enters the field and is polled by the transceiver.

The logic for programming such a tag may be either on board the tag in the logic processor component 120, or may be in a system of which the tag is a part and the programming commands may be part of the RF polling signal received by the tag from the transceiver and subsequently conveyed to the memory 122. Given the description of the present invention provided herein, the implementation details of such logic in either manner are well known to those of skill in the art and a further explanation of these details is beyond the scope of the present invention.

Figure 2B:
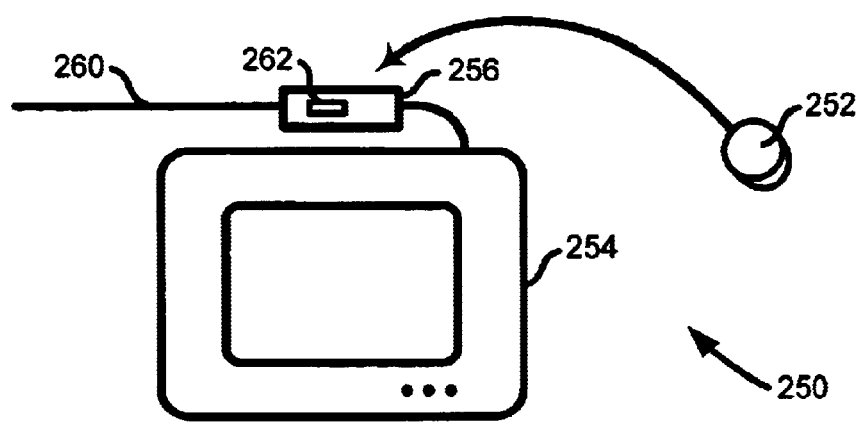
FIGS. 2B and 2C depict simplified diagrams illustrating features of media access and control RF systems in accordance with preferred embodiments of the present invention.
Figure 2C:
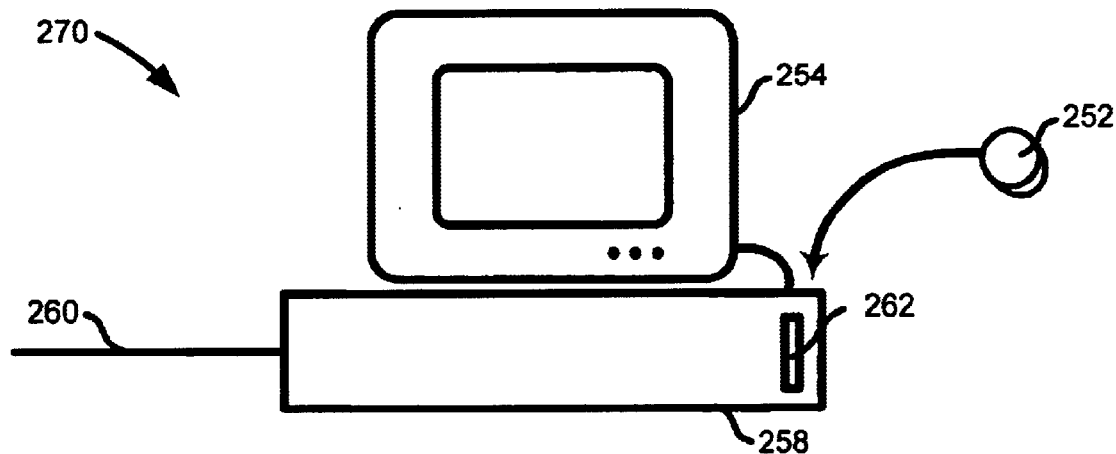

FIGS. 2B and 2C illustrate simplified diagrams of media access and control RF systems in accordance with preferred embodiments of the present invention. Each of the systems 250 and 270 includes a media access and/or control RF tag 252 and a media player 254, for example, a video monitor and/or loudspeakers, or a television. The media player 254 has apparatus connected with it for accessing electronic media. The access apparatus may be, for example, a cable set-top box 256 for accessing electronic media via a cable television network system, as illustrated in FIG. 2B. Alternatively, the access apparatus may be a networked personal computer or workstation 258 for accessing information over a computer network, such as the Internet/World Wide Web, as illustrated in FIG. 2C. The structural and operational details of cable set-top boxes and network personal computers are well known to those of skill in the art and further description of these is not required in order to allow one of skill in the art to implement the present invention. Of course, other access apparatuses may also be used in connection with the invention, including apparatuses for accessing local electronic media, such as from an individual's or institutions large music or film collection.

A cable 260 represents a link to the electronic media source whatever the access apparatus. It should be understood that the link to the media source may also be wireless, or in the case of a local source of media, unnecessary. Also, whatever the system, the access apparatus includes a RF transceiver which emits a polling signal in order to detect an RF tag 252, read its memory, relay its programmed data to media player components responsible for carrying out access and/or control commands, and for writing to the tag's memory. Given the description of the present invention provided hereon, the implementation details of such RF systems are well known to those of skill in the art and a further explanation of these details is beyond the scope of the present invention.

Media access and control RF tags and systems in accordance with the present invention combine or supplement existing functionalities of various media access and control devices in a versatile RF tag format. With respect to such a tag's access component, the tag may, for example, be programmed to limit access to a certain period of time (i.e., one-time-only, or one-month's access), to certain time's of the day (i.e., between the hours of 3:00 and 8:00 pm), or to certain media sources (i.e., only G and PG rated programs, or only channels 3 and 6, or only certain parts of a website). As noted above, with respect to the control component, the tag may be written to with control parameters, for example, user preferences or position based on previous uses of the media or a user profile.

The electronic media is preferably accessed via a network, such as a computer network, for example intranets, the Internet or the World Wide Web, a cable modem network, or a satellite-based broadcast network. In one particularly preferred embodiment, a system in accordance with the present invention includes a RF media access and control tag and a RF transceiver associated with or incorporated in a cable television set-top box. The tag may be programmed to provide access to the user based on the user's subscription agreement with the cable provider, and/or with appropriate control parameters based on user preference. These access and/or control parameters may be written to the tag's memory at any time; before, during or following use. In another particularly preferred embodiment, a system in accordance with the present invention includes a RF media access and control tag and a RF transceiver associated with or incorporated in a networked personal computer. The tag may be programmed with a URL to provide access to a particular Internet or World Wide Web site.

Media access and/or control RF tags in accordance with the present invention have a myriad of potential applications. The small size and versatility of passive RF tags with respect to materials that may be used to house tags provide distinct advantages over alternative technologies, such as optical (e.g. bar code), magnetic and electronic interfaces which require electrically conductive contacts. RF tags are also not subject to the same limitations and reliability issues as these technologies, such as optical interference, demagnetization, or fouled electrical contacts.

Various embodiments and applications of the invention will now be described with reference to simplified block diagrams. RF tag and system structures and configurations are well known to those of skill in the art, and implementation details of RF tags, beyond the functional elements described herein, are not the focus of the present invention. One of ordinary skill in the RF tag technology art would be able to make and implement tags and systems in accordance with the present invention without specific guidance with regard to the combination and configuration of all tag, transceiver, player and associated device structural elements, and the present invention is not limited by any particular implementation.

Media access and control radio frequency tags in accordance with the present invention preferably include a passive radio frequency transponder having an antenna, an integrated circuit responsive to a signal received from a radio frequency transceiver to return a signal comprising at least one of access and control parameters relating to a piece of electronic media content to the transceiver, and a memory operative to provide storage and retrieval of data relating to the parameters. The nature of the media and its source, and the form of the tag may vary substantially while remaining consistent with this inventive concept, as discussed in more detail below.

Pucks

Figure 3:
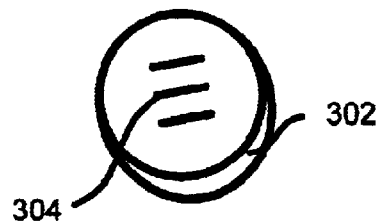
FIGS. 3–7 depict block diagrams illustrating media access and control RF tags in accordance with preferred embodiments of the present invention.

Tags in accordance with the present invention may be embodied in housings which have no other purpose. FIG. 3 illustrates an example of such an implementation of a tag in accordance with a preferred embodiment of the present invention. The housing 302 has the form of a small disc or "puck" which is conveniently manipulated and stored by the user. The puck 302 is conveniently substantially circular and about 1 to 6 inches in diameter. Of course, this is just one preferred embodiment for a housing, which may generally be of any shape and size that is convenient for a user to manipulate. A RF tag having structural features such as described with reference to FIG. 2A is contained within the housing 302. The puck 302 may also have a label 304 to identify the media accessible with the puck.

In practice, a user would position the puck 302 within the RF field of a polling RF transceiver associated with an electronic media player. The polled tag in the puck 302 would return the access and/or control parameters programmed in its tag's memory to the transceiver thereby enabling the media to be accessed from a source, typically via a computer or television network, and played in a manner determined by the parameters.

For example, the puck could be part of a recorded music distribution system. Instead of purchasing or renting a cassette or compact disc with a particular artist's recording, a person would purchase or rent a puck in accordance with this embodiment of the present invention. The puck would bear a label identifying the particular recording it accesses and its tag would be programmed to access that recording via a computer or cable modem network system from a source connected to that network. The tag's memory could also be programmed with an initial set of control parameters (default parameters) for playing the media.

To play the media, the user would place the puck within the RF field of a polling RF transceiver associated with or embedded in a media player connected to a source for the electronic media, such as a networked personal computer or a cable television set-top box. The polled tag in the puck returns a signal to the transceiver indicating the source of the media to be played (e.g., a URL or a cable access code stored in the puck's RF tag memory), the user's access privileges (e.g., entitled to listen to all tracks of a particular recording indefinitely, or entitled to listen to just some tracks for a limited period of time), and/or the programmed control parameters (e.g., volume, bass and treble levels). Given the access and/or control information, the transceiver would then convey the information to an associated media retrieval component, such as a web browser or a signal management system in a cable television network. The retrieved media may then be played on the associated player. The user may adjust the control parameters based on personal preference. The adjusted control parameters may then be written to the puck's tag memory for retrieval the next time the puck is used. Similarly, the user's place in the playback of the media may be written to the memory so that play may be resumed from the previous stopping place the next time the puck is used.

Another application for pucks in accordance with the present invention is in the area of video, particularly video-on-demand. A cable TV subscriber could be issued one or more pucks in accordance with the present invention. Each puck could be programmed with its own particular set of access and/or control parameters. For example, the adults in a household could have pucks with one set of parameters, while the children have pucks with a different set. The parameters could determine what programming is accessible over a cable television system, and when it is accessible. The other features of tags in accordance with the present invention discussed above, could also apply here.

Promotional or Advertising Material

Figure 4:
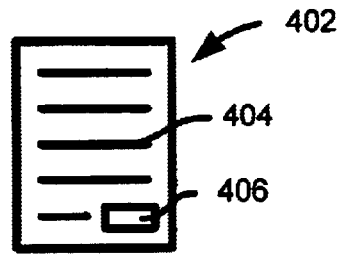

In another embodiment, the media access and/or control tags may be housed in promotional or advertising materials for goods or services. The materials may be composed of any suitable substrate for printed text and a RF tag, preferably paper. For example, as illustrated in FIG. 4, a tag in accordance with the present invention may be attached to a paper advertisement or promotion, such as a newspaper insert or a magazine page 402. The page 402 may include printed text 404 about a particular product or service and instructing the reader in the use of the page 402 with the attached tag 406. For example, the text may instruct the reader to place the page 402 on top of his or her cable set-top box in order to get some free trial-basis access to a new channel of cable TV programming. After the promotional time expires, the tag's memory would be written void. The set-top box would be equipped with a transceiver for polling the tag and responding to its programmed access parameters, as described above.

This concept could apply equally to other materials, such as plastics, and to other media sources, such as the World Wide Web, also as described above. In this particular embodiment of the invention, the focus is on access rather than control, since the access would typically be limited in time. However, where the duration of access is sufficiently long, control parameters based on user preference or position may also be written to the tag's memory for use in subsequent accessing of the media.

Consumer Products and Packaging

Figure 5:
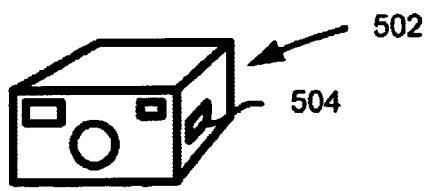
Figure 6:
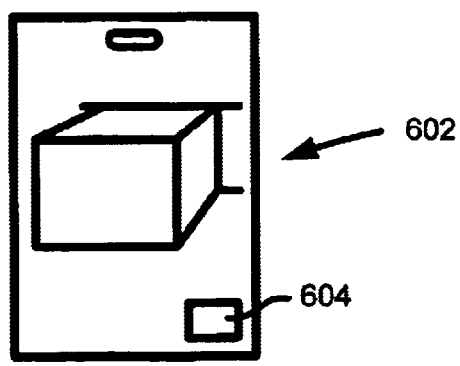

FIGS. 5 and 6 illustrate additional embodiments of the present invention in which media access RF tags may be housed in consumer products or packaging. FIG. 5 illustrates a consumer product 502, namely a camera, which has a media access RF tag 504 in accordance with the present invention attached to it or embedded in it. The tag's memory is programmed with a URL for a World Wide Web site accessible to owners of that particular brand of camera. In some embodiments, access to the website may be restricted to camera owners, with the access information programmed into the memory of the tag 504. In order to access the manufacture's website to obtain technical or customer service media, the user would simply place the camera within the field of a RF transceiver associated with a device providing access to the World Wide Web, preferably a personal computer or cable TV set-top box. The transceiver would read the tag and convey the tag's programmed URL to a web browser or other similar component to access the website.

Similarly, FIG. 6 illustrates consumer product packaging 602 including a RF tag 604 having similar functionality to that described with reference to FIG. 5. RF transceivers connected to media sources (e.g., the World Wide Web) and players may be made available at stores carrying the products so that shoppers could use RF tags in the packaging of products of interest to access media about the products.

A further application of RF tags and systems in accordance with the present invention in the implementation described with reference to FIG. 5 is the ability to provide cross-promotions between a consumer product and electronic media. For example, a candy wrapper may contain a RF tag that when placed on a cable TV set-top box and polled by its associated RF transceiver, would give the user free access to a new cable TV channel for a limited period of time. After the time expires, the tag's memory would be written void.

Still another example of this implementation involves the placement of a media access/control RF tag in or on the packaging for a compact disk (CD) (e.g., the "jewel box"). When the jewel box is placed on a cable TV set-top box or a personal computer linked to the World Wide Web, and polled by its associated RF transceiver, the user may be given access to a video associated with the CD, either on a cable TV channel or online.

Interactive Media Access and Control Tags

Another aspect of the present invention combines the media access and control features described herein with interactive features, such as described in application Ser. No. 09/306,688, filed May 6, 1999 and entitled Interactive Radio Frequency Tags, the disclosure of which is incorporated by reference herein for all purposes. Such interactive RF tags are responsive to external stimuli to change state. They may include a passive radio frequency transponder, having an antenna, an interface for receiving an external stimulus, and one or more integrated circuits responsive to the external stimulus received at the interface to change the state of the transponder. An example is a tag configured to change state when a user contacts and/or manipulates an interface on the tag, for example, one or more buttons on the tag is pushed or moved by a user ("button tags").

For instance, interactive button tags may be used in a RF tag media controller. With the media controller, traditional music or video functions (e.g., play, stop, pause, fast forward, rewind) are represented by interactive buttons on, for example, a playing card-size tag. When a user presses a button, the state of the tag changes to provide a response corresponding to the selected function to a polling transceiver integrated with the media player.

Interactive button tags may also be used in other control applications, for example, a "web card." A web card may have a similar construction to the media controller discussed above, with one or more buttons each representing a different web page or site, or for otherwise controlling a web browser. A user may, for example, select a desired web site by pushing a button on the card. An identifier (ID) for the selection is read by a transceiver integrated with a computer with access to the World Wide Web. The computer then uses this ID as a URL, or looks up the URL associated with the selection's ID in a database, with the result that the URL for the site is entered in a web browser on the computer and the site is accessed.

Figure 7:
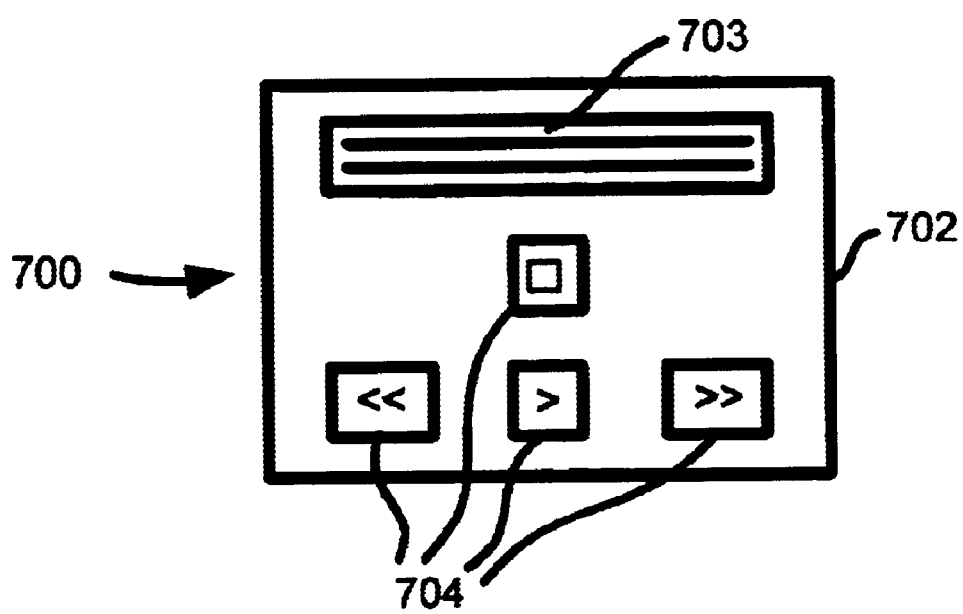

This interactive RF tag controller concept may be combined with the media access and/or control concept of the present invention to produce interactive media access and control RF tags. FIG. 7 provides a simple block diagram of such an interactive media access and control RF device 700 in accordance with a preferred embodiment of the present invention. The device's housing 702 has the form of a small card (such as a credit card) which is conveniently manipulated and stored by the user. Of course, the housing may take a myriad of other possible forms. A RF tag having structural features such as described with reference to FIG. 2A is contained within the housing 702. The housing 702 may also have a label 703 to identify the media accessible with the device 700.

In addition, the device 700 has one or more buttons 704 representing traditional music or video functions (e.g., play, stop, fast forward, rewind). Alternatively, the buttons could represent different web pages or sites, or functions for otherwise controlling a web browser. These buttons may be implemented as switches integrated into a basic RF tag structure as described and illustrated in application Ser. No. 09/306,688. When a user presses a button, the state of the tag in the device changes to provide a response corresponding to the selected function to a polling transceiver integrated with a media player.

In practice, a user would position the device 700 within the RF field of a polling RF transceiver associated with an electronic media player. The polled tag in the device 700 would return the access and/or control parameters programmed in its tag's memory to the transceiver thereby enabling the media to be accessed from a source, typically via a computer or television network, and played in a manner determined by the parameters. The user could then use the buttons 704 to control the playing of the media. Thus, this embodiment of the invention combines functionalities of media access and/or control tags, such as the pucks described above, and interactive RF tags, such as those described and claimed in application Ser. No. 09/306,688, previously incorporated by reference.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A radio frequency tag apparatus, comprising:
   a passive radio frequency transponder, including,
      an antenna,
      an integrated circuit configured to receive data associated with signals received at said antenna from a radio frequency transceiver and to return to the transceiver via said antenna a signal comprising an access parameter relating to a piece of limited access electronic media content, and
      a memory connected to said integrated circuit and operative to provide storage and retrieval of data relating to said access parameter and a control parameter, said access parameter and said control parameter modified by playing said piece of limited access electronic media content and saved to said memory after playing said piece of limited access electronic media content;
   wherein access to the piece of limited access electronic media content is limited and access to the limited access electronic media content is provided to an authorized person by providing said authorized person with a physical article comprising the passive radio frequency transponder.

2. The radio frequency tag apparatus of claim 1, wherein said limited access electronic media content is audio.

3. The radio frequency tag apparatus of claim 1, wherein said limited access electronic media content is visual.

4. The radio frequency tag apparatus of claim 1, wherein said limited access electronic media content is audiovisual.

5. The radio frequency tag apparatus of claim 2, wherein said limited access electronic media content is prerecorded music.

6. The radio frequency tag apparatus of claim 4, wherein said limited access electronic media content is a motion picture.

7. The radio frequency tag apparatus of claim 1, wherein said limited access electronic media content comprises information on a computer network.

8. The radio frequency tag apparatus of claim 7, wherein said computer network comprises the Internet.

9. The radio frequency tag apparatus of claim 1, further comprising:
an interface for receiving an external stimulus, and
one or more integrated circuit components responsive to an external stimulus received at said interface to change the state of said transponder.

10. The apparatus of claim 9, wherein said change of state of said transponder signals said transceiver to effect a control function with respect to a player of said limited access electronic media.

11. The apparatus of claim 10, wherein said control function comprises at least one of play, stop, pause, fast-forward, rewind, volume and track selection.

12. The apparatus of claim 9, wherein said interface comprises one or more buttons.

13. The apparatus of claim 10, wherein said interface comprises a plurality of buttons.

14. The apparatus of claim 1, wherein said apparatus is usable more than once, and said memory stores data relating to user control function preferences.

15. The apparatus of claim 1, wherein said memory is written void after providing access to a piece of limited access electronic media content, such that said apparatus is usable only once.

16. The apparatus of claim 1, wherein said physical article is a puck comprising plastic.

17. The apparatus of claim 1, wherein said physical article is comprised of a paper material.

18. The apparatus of claim 1, wherein said physical article comprises a consumer product.

19. The apparatus of claim 1, wherein said physical article comprises packaging material for a consumer product.

20. The apparatus of claim 1, wherein said physical article is advertising literature.

21. A radio frequency media access and control system, comprising:
a radio frequency transceiver, including,
an antenna,
a radio frequency field generator associated with said radio frequency transceiver antenna, and
a processor configured to control said radio frequency generator to produce a signal and provide said signal to said antenna, and responsive to a signal returned by a passive radio frequency transponder and received via said antenna to provide access to a piece of limited access electronic media content; said passive radio frequency transponder, including,
an antenna,
an integrated circuit configured to receive data associated with signals received at said passive radio frequency transponder antenna from said radio frequency transceiver and to return to the transceiver via said passive radio frequency transponder antenna a signal comprising an access parameter relating to a piece of limited access electronic media content, and
a memory connected to said integrated circuit and operative to provide storage and retrieval of data relating to said access parameter and a control parameter, said access parameter and said control parameter modified by playing said piece of limited access electronic media content and saved to said memory after playing said piece of limited access electronic media content;
wherein access to the piece of limited access electronic media content is limited and access to the limited access electronic media content is provided to an authorized person by providing said authorized person with a physical article comprising the passive radio frequency transponder.

22. The system of claim 21, wherein said transceiver is comprised in a cable television set-top box and said limited access electronic media content is accessed via a cable television network system.

23. The system of claim 21, wherein said transceiver is comprised in a personal computer system.

24. The system of claim 23, wherein said personal computer system is connected to a computer network.

25. The system of claim 24, wherein said computer network comprises the Internet.

26. A method for providing subscriber-specific electronic media access and control, comprising:
providing a subscriber with a physical article comprising a passive radio frequency transponder having a memory programmed with an electronic media access parameter and a control parameter, said access parameter and said control parameter modified by playing limited access electronic media content and saved to said memory after playing said limited access electronic media content;
wherein said access parameter allows the subscriber to access particular limited access electronic media content defined by the parameter when said transponder is read by a radio frequency transceiver connected with a player for said limited access electronic media; and
wherein access to said limited access electronic media content is limited and access to the limited access electronic media content is provided to said subscriber person by providing said subscriber with said physical article comprising the passive radio frequency transponder.

27. The method of claim 26, wherein said media access parameter comprises a universal resource locator (URL).

28. The method of claim 26, wherein said media access parameter comprises a cable television signal access code.

* * * * *